United States Patent Office 2,730,430
Patented Jan. 10, 1956

2,730,430

CYANOGEN PRODUCTION

James K. Dixon, Riverside, and James E. Longfield, Stamford, Conn., assignors to American Cyanamid Company, New York, N. Y., a corporation of Maine No Drawing. Application January 11, 1955, Serial No. 481,283

4 Claims. (Cl. 23—151)

This invention relates to the preparation of cyanogen and more particularly to a method for producing cyanogen from cyanogen chloride.

In recent years, cyanogen has gained prominence as a chemical compound of commerce. Cyanogen possesses utility as a fumigant, a gas for welding, a nitrogen additive to steel-making, and in chemical synthesis, for instance, in the preparation of oxamide by acid hydrolysis.

Previously, cyanogen had been prepared among others, by the thermal decomposition of heavy metal cyanides and by heating copper sulfate and alkali cyanides in an aqueous menstruum. These methods do not lend themselves to commercial production since yields of cyanogen are unattractive. More recently, an improved method for economical large scale production of this product has been proposed in U. S. Letters Patent 2,399,361. That process involves the reaction of hydrogen cyanide with chlorine or cyanogen chloride at elevated temperature in the vapor phase. While almost quantitative yields are said to be obtainable, the process is not wholly suitable as it requires the use of anhydrous hydrogen cyanide which is relatively expensive. Its use, therefore, seriously limits the application of this process to commercial large scale production.

Accordingly, it is a prime object of this invention to devise a process which avoids the use of anhydrous hydrogen cyanide as a reactant. It is a further object to prepare cyanogen from relatively inexpensive reactants that are entirely satisfactory for large scale production. Still other objects will be apparent from the hereinafter description.

To this end, cyanogen may be easily prepared in a straightforward manner by the hydrogenation of cyanogen chloride in the vapor phase. The reaction is unexpected because hydrogen was not known to combine with cyanogen chloride and, surprisingly, cyanogen is now obtainable in almost quantitative yields under controlled conditions of time and temperature.

It is a particular advantage of the present process to utilize cyanogen chloride as a reactant. The latter can be easily prepared by bubbling chlorine into aqueous hydrogen cyanide which is maintained at a temperature of about 80° C. and collecting resultant cyanogen chloride. It is a further advantage to utilize hydrogen which is inexpensive and less corrosive than chlorine in the instant process.

According to the process of the invention, cyanogen is produced by a new reaction involving hydrogen and cyanogen chloride in the vapor phase. A molar excess of cyanogen chloride is swiftly contacted with hydrogen at elevated temperatures. In this manner, good to quantitative yields of cyanogen are obtained without formation of appreciable undesirable by-products. If needed, a final purification step may be desirable to remove traces of by-products.

The reaction may be carried out by reacting one mol of hydrogen with at least two mols of cyanogen chloride in a suitably heated vessel by simultaneously admixing the reactants prior to reaction. In general, two mols or more of cyanogen chloride are required, and preferably at least three mols of cyanogen chloride. While the upper mol limit of cyanogen chloride is not critical in the operation of the present process, the quantity is limited by economic considerations, since a mol excess greater than four does not aid in perfecting the yield of cyanogen. In general, therefore, a mol excess of cyanogen chloride of from one to four mols is advantageously utilized.

It has been found that the temperature of reaction may vary over a considerably wide range; namely, from about 400° C. to about 1000° C., and preferably from about 650° C. to about 950 C. Temperatures substantially lower than 400° C. require too long a contact time, with concomitant formation of undesired by-products. Temperatures exceeding 1000° C., although operative, are not necessary to obtain quantitative yields of cyanogen. Further, these temperatures demand high power requirements, as well as the use of expensive thermally insulated reactors, all of which unnecessarily detract from the process as being commercially feasible.

The time of contact may be varied from at least about one-half second to about one minute. A time of less than one-half second is insufficient to obtain substantial reaction, whereas a time of more than a minute results in excessively large by-product formation. In general, the time of contact is inversely proportional to the contact temperature. Thus, for example, at 950° C. a contact time of two seconds is entirely satisfactory whereas at 450° C., a contact time of about fifty seconds is demanded. Since it is preferred to attain as short a contact time as possible, generally between one second and twenty seconds, and preferably between one and five seconds, elevated temperatures in excess of about 600° C. may be utilized.

Any suitably thermally insulated reactor may be used. For instance, a Pyrex tube or a quartz tube may be advantageously employed. The tube may or may not be packed with quartz chips. If the tube is so packed, the time of contact may be further reduced. While a carbonaceous catalyst, such as activated charcoal, may be used in the reactor, its presence is not wholly necessary because the time of contact is sufficiently short in the absence of any catalyst.

The invention will be further illustrated in detail by the following specific examples. It should be understood, however, that although these examples may describe some of the more specific features of the invention, they are given primarily for purposes of illustration, and the invention in its broader aspects is not to be construed as being limited thereto.

*Example 1*

Hydrogen and cyanogen chloride in a mol ratio of 1:3 respectively are admixed and reacted in a quartz tube at a temperature of 850° C. The time of contact during reaction is about 20 seconds. The evolved off-gas is then cooled to room temperature and is passed through a water scrubber which removes traces of undesired by-product. Cyanogen issues from the top of the scrubber. By infra-red analysis, the yield of cyanogen based on either input hydrogen or consumed cyanogen chloride is 95%.

*Example 2*

Repeating Example 1, the temperature of reaction was increased to 950° C. and the contact time decreased to two seconds. By infra-red analysis, the yield of cyanogen based on hydrogen input is 97%.

*Example 3*

Following the procedure of Example 2 and employing the same mol ratio of hydrogen to cyanogen chloride, the quartz tube is additionally packed with quartz chips. The time of contact is further reduced to one second. Infra-red analysis indicates that the yield of cyanogen is substantially quantitative, i. e., 98% based on the hydrogen input.

*Example 4*

In a run repeating Example 2, the mol ratio of hydrogen and cyanogen is adjusted to 1:2 respectively. The yield of cyanogen obtained is 84% based on hydrogen input.

*Example 5*

A mixture of hydrogen and cyanogen chloride in a mol ratio of 1:3 respectively is reacted in a thermally insulated Pyrex tube at a temperature of 640° C. and for a contact time of about twenty seconds. The evolved offgas is cooled to room temperature and then is passed through a water scrubber to remove impurities. The yield of cyanogen based upon hydrogen input is 40%.

*Example 6*

A mixture of hydrogen and cyanogen chloride in a mol ratio of 1:4 respectively is reacted in a thermally insulated Pyrex tube, packed with pulverized activated charcoal, at a temperature of 450° C. for a contact time of 50 seconds. The evolved off-gas is then cooled to room temperature and passed through a water scrubber to remove occluded undesired by-products. Cyanogen issues from the scrubber in an amount corresponding to 35% based on hydrogen input.

We claim:

1. The process for the preparation of cyanogen which comprises: mixing one mol of hydrogen with at least two mols of cyanogen chloride in the vapor phase; subjecting said mixture to reaction conditions at a temperature of at least 400° C. and for a contact time of at least one-half a second but not more than about sixty seconds; and recovering cyanogen.

2. The process according to claim 1 wherein the mol ratio range of hydrogen to cyanogen chloride is 1:2 to 4.

3. The process according to claim 1 wherein the temperature of reaction is maintained from about 650° C. to 950° C. and the time of contact of from about one second to about twenty seconds.

4. The process for the preparation of cyanogen which comprises: mixing one mold of hydrogen with three mols of cyanogen chloride in the vapor phase; subjecting said mixture to a temperature of 950° C. for a contact time of two seconds; and recovering cyanogen.

No references cited.